United States Patent [19]

Schindler

[11] Patent Number: 5,630,037

[45] Date of Patent: May 13, 1997

[54] METHOD AND APPARATUS FOR EXTRACTING AND TREATING DIGITAL IMAGES FOR SEAMLESS COMPOSITING

[75] Inventor: Keith W. Schindler, Malibu, Calif.

[73] Assignee: Schindler Imaging, Inc., San Jose, Calif.

[21] Appl. No.: 245,377

[22] Filed: May 18, 1994

[51] Int. Cl.$^6$ .................................................. G06T 5/40
[52] U.S. Cl. ........................ 395/131; 348/592; 348/598; 382/164; 382/171; 382/282; 382/283
[58] Field of Search ............................ 395/131; 348/578, 348/591, 592, 594, 598; 382/163, 164, 168, 171, 173, 282, 283

[56] References Cited

U.S. PATENT DOCUMENTS

| | | | |
|---|---|---|---|
| 4,811,084 | 3/1989 | Belmares-Sarabia et al. | 348/592 |
| 5,014,328 | 5/1991 | Rudak | 382/163 |
| 5,185,808 | 2/1993 | Cok | 382/284 |
| 5,251,016 | 10/1993 | Delwiche | 348/587 |
| 5,262,856 | 11/1993 | Lippman et al. | 348/415 |
| 5,313,304 | 5/1994 | Chaplin | 348/587 |
| 5,345,313 | 9/1994 | Blank | 348/598 |
| 5,355,174 | 10/1994 | Mishima | 348/592 |
| 5,382,980 | 1/1995 | Gehrmann | 348/586 |
| 5,386,242 | 1/1995 | Chaplin | 348/591 |

OTHER PUBLICATIONS

Page from Prospectus of Out–Takes, Feb. 3, 1993.

*Primary Examiner*—Mark K. Zimmerman
*Attorney, Agent, or Firm*—Lyon & Lyon

[57] ABSTRACT

An image processing system for extracting and treating a digitized color subject image for seamless compositing against an arbitrary background includes the generation of a final control image from the image of a subject in front of a screen consisting of a range of colors. A sample of the background screen is captured and analyzed using filter kernels to determine a range of red, green and blue values which are stored in separate histograms. A first control image is generated by comparing mean histogram data with the subject image. A final control image is generated by dividing the first control image into separate background, foreground and fringe regions. A treated subject image is generated by leaking color from the local background region into the fringe regions of the subject image using filter kernels. The treated image is suitable for compositing against an arbitrary background image. The composite image may be touched up by using a software brush which on each pass of the brush expands the background region by eliminating immediately adjacent fringe pixels, causes other nearby fringe pixels to increase in translucence, and allows the boundary of the fringe region to encroach on the foreground region. Simultaneously, the brush may also cause fringe pixels to absorb some of the color of neighboring foreground pixels.

21 Claims, 12 Drawing Sheets

SUBJECT IMAGE

HISTOGRAM DATA

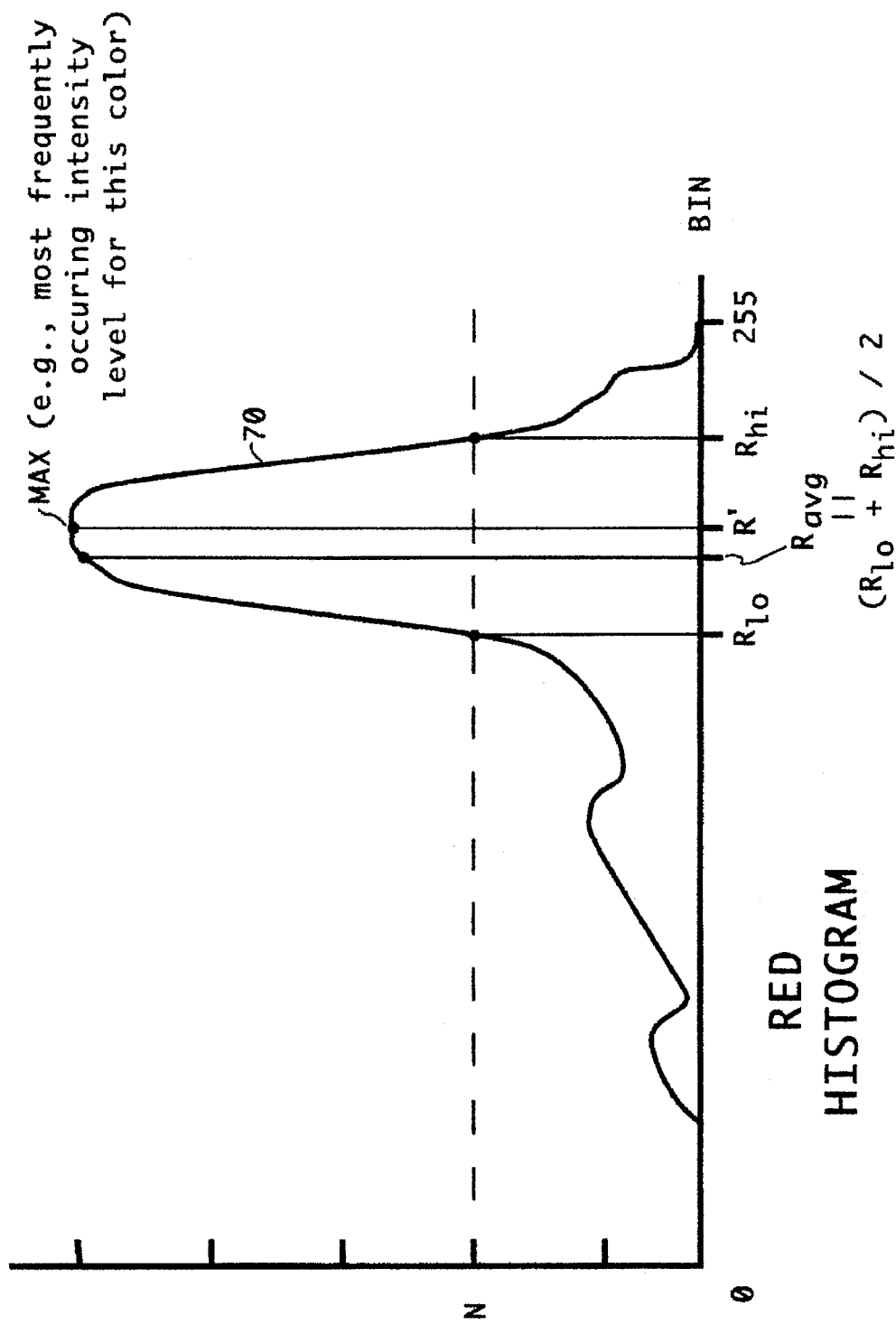

CONTROL IMAGE 2

METHOD AND APPARATUS FOR EXTRACTING AND TREATING DIGITAL IMAGES FOR SEAMLESS COMPOSITING

FIELD OF THE INVENTION

The present invention relates to the field of digital image processing and, more particularly, to a method and apparatus for extracting and treating digitized color images for seamless compositing.

BACKGROUND OF THE INVENTION

Analog video techniques have existed for many years whereby a live action video signal may be composited against a background of another arbitrary image when the foreground subject is set in front of a colored screen (typically a green or blue screen). For example, a local news weatherman may be composited against a background of a weathermap when the weatherman is actually standing in front of a blue or green colored screen. In some instances, a table of red, blue and green spectra is produced, and the background color range is interactively selected from the table. The composited image depicts the weatherman in front of the weathermap while the blue or green background is generally eliminated. Such compositing techniques are often referred to as "chroma key" techniques.

More recently, techniques have been developed using digital hardware whereby a digitized image may be stored in a framestore or in a memory comprised of pixels, where each pixel consists of three values corresponding to the red, green, and blue intensities at the appropriate pixel location on the video output device when the full color image is displayed. Such techniques, however, have several drawbacks. One drawback is that the screen in front of which the subject is shot must usually be either pure green or pure blue due to the nature of the chroma-key process. A second drawback is that the screen in front of which the subject is shot must be evenly lit. Uneven lighting causes uneven shading of the screen, making it difficult for such systems to distinguish between subject and screen.

Another drawback with conventional techniques is that no part of the background color may appear in the foreground subject. For example, if the background screen is blue, then no part of the subject may be blue or else the blue part of the subject may disappear or become translucent in the final composite. The same is true with a green screen and green parts of the subject.

More refined techniques have been developed to allow the subject to contain colors of similar hue as the background screen in front of which the subject was shot (albeit darker or lighter so as not to be confused with the screen itself), but these techniques usually degrade the quality of the subject colors in the final composite. Further, such techniques may not provide proper treatment of the fringe regions of the composited subject (except under strict lighting conditions), thus inadequately removing the "seam" of the original screen color surrounding the subject.

Means presently exist to touch-up extracted and treated digital images in order to correct discrepancies between the original subject image and the treated image. A "stencil brush" (i.e., a predefined graphical area on a computer screen controlled by a user) may be dragged over the fringe region of the treated image which will add the original foreground color to user-selected areas of the image. An "inverted stencil brush" similar to a stencil brush but has the effect of erasing the foreground color in user-selected areas. Neither of these touch-up methods is fully satisfactory, however, because they do not treat the translucent area of the seam which may contain remnants of the original screen color.

It would therefore be advantageous to have a means for compositing against an arbitrary background image a digitally acquired image of a foreground subject shot in front of a colored screen. It would further be advantageous to provide such a means without having restrictions placed on the lighting of the subject, so that the subject may be lit in a manner which matches the lighting conditions that originally existed or which exist artificially in the background image. It would further be advantageous to have a means for extracting a foreground subject which contains colors that are close to the color of the background region, and without limiting the background region to be a primary color but while allowing some gradations of hue in the background region. It would further be advantageous to have a means for treating a digitally acquired subject image such that, regardless of how the subject was lit, colored borders around the seam or fringe region of a subject are minimized or eliminated. It would further be advantageous to have a fast and efficient means for touching up the subject borders in those cases where the colors of the subject border are very close to the color or colors of the surrounding screen.

SUMMARY OF THE INVENTION

The present invention provides a method and apparatus for extracting a full-color digitized image of arbitrary resolution and treating the extracted image so that it may be composited against an arbitrary background image. The technique generally comprises obtaining a foreground (subject) image shot against a screen or similar background, analyzing the screen area to determine its characteristics, creating two or more control images, and treating the fringes of the foreground image based on the control images and information obtained from analyzing the screen area. In one embodiment, analyzing the screen area further comprises the generation of histogram data relating to red, green and blue colors in the screen area and determining an average color composition of the screen area. A first control image may be generated based on the difference between each foreground pixel and the average color composition of the screen area. A second control image may be generated by dividing the first control image into foreground, background, and fringe sections. Treating the fringes may comprise using the second control image to determine where fringe pixels are located, leaking localized background color into the fringe pixels, and creating a binary image to record which pixels have been treated and to otherwise facilitate processing. The fringe treatment process may be carried out iteratively, and dynamic lists may be used to keep track of pixels to be treated.

The invention also provides, in one embodiment, means for touching up the fringe regions of an extracted image interactively by recompositing the foreground and leaking in an amount of foreground color in proportion to the surrounding foreground region.

The invention may be embodied as an interactive digital system consisting of a processor or processors, memory for storing digital representations of various images and associated data upon which the processor(s) operate, software or firmware for controlling the processor(s) and implementing the processes described in this application, a framestore and video display device for displaying various images and representations of data, and an interactive input device or devices for setting processing parameters interactively and for specifying areas of an image upon which to operate.

The inventive techniques described herein may be applied to a single image such as in digital still photography (where, for example, images may be scanned from various graphical media or framegrabbed from video), or to sequences of images of arbitrary resolution or aspect ratio that have been digitized from frames of film or frames of video.

BRIEF DESCRIPTION OF THE DRAWINGS

The invention will now be described by way of example with reference to the accompanying drawings, in which:

FIG. 3D is a diagram of a histogram;

DESCRIPTION OF THE PREFERRED EMBODIMENTS

The present invention provides a method and apparatus for extracting a full-color digitized image of arbitrary resolution and treating the extracted image so that it may be composited against an arbitrary background image. Although the invention is described with respect to particular embodiments having a particular number or order of processing stages, it will be appreciated by those skilled in the art that the number, order and nature of the processing stages may vary without departing from the spirit and scope of the invention.

Figure 1:
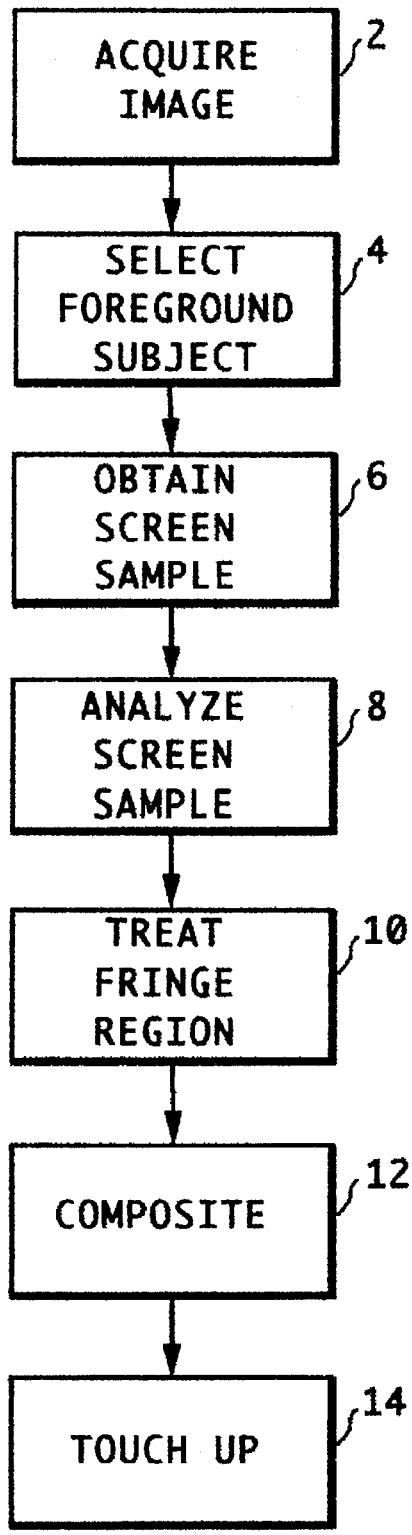
FIG. 1 is a block diagram of an image compositing system.

A block diagram of an image extraction and compositing system is shown in FIG. 1. The system generally comprises an image acquisition step 2, a foreground subject selection step 4, a screen sample selection step 6, a screen sample analysis step 8, a fringe treatment step 10, and a compositing step 12. An optional touch-up step 14 may also be added if necessary or desired.

Figure 3A:
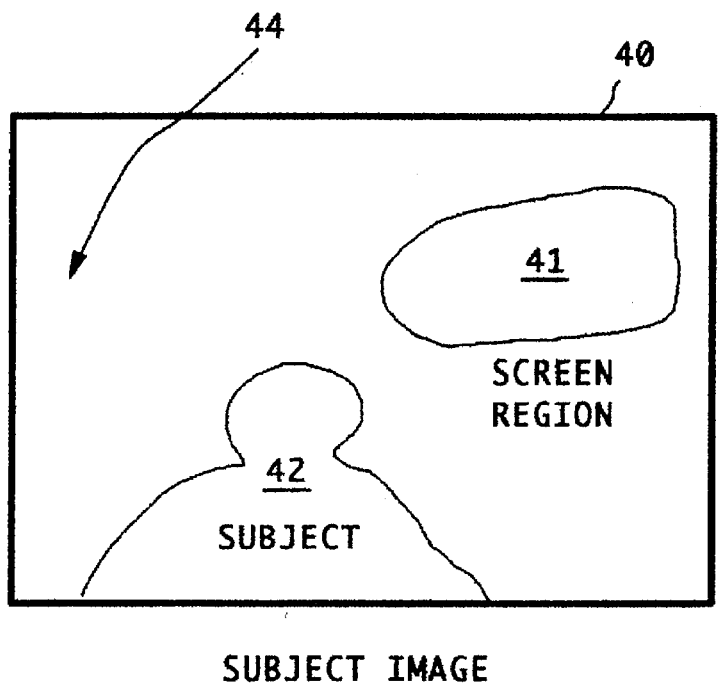
FIG. 3A is a diagram showing a foreground, subject, screen, and screen region.

The image acquisition step 2 comprises initial acquisition of a digitized image 40 (see FIG. 3A) by any general means known in the art. For example, techniques are known in digital still photography whereby, for example, images may be scanned from various graphical media or framegrabbed from video. An image may be acquired by digitizing frames of film or of video, or may be acquired from an electronic or magnetic storage medium such as a laser or optical disk, a floppy or hard disk, a tape drive or any other storage medium. The digitized image consists of a plurality of pixel values stored in memory, where each pixel is represented by red, green, and blue binary values. These binary values correspond to specific red, green, and blue intensities comprising a color at specific pixel locations on a display screen, and may, for example, be converted through digital to analog conversion of an image display device to specific colors on the display screen.

Pixel data are often represented by 8-bit values ranging from 0 to 255. For example, a pixel having a red value of 0 would indicate the absence of red coloration at the particular pixel location, while a pixel having a red value of 255 would indicate maximum red coloration at the particular pixel location. Values between 0 and 255 represent various intensities of red between the two extremes. Although the present embodiment uses 8-bit values, it will be appreciated that 10-, 12- or 16-bit values, or any other representation of pixel data, can be used.

The digitized image 40 has a foreground subject 42 which it is assumed will be composited, after extraction and treatment, with an arbitrary digitized background image. The digitized image 40 may have a background screen 44 of any color, and need not be limited to a particular primary color (such as blue), so long as the background is relatively uniform. The term "screen" is used generically and may refer to a colored screen, wall, backing or any other uniformly lit area in front of which the subject is positioned. Whereas certain variations in hue, shading and lighting may be tolerated, the background screen 44 is preferably not of widely diverging colors or lighting.

Once a digitized image 40 has been acquired, the foreground subject acquisition step 4 is carried out. The foreground subject 42 may be selected by any number of techniques well known in the art (e.g., using a mouse or tablet). For example, if a digitized image 40 is displayed on a computer terminal, a user may interactively select a foreground subject 42 by using an imprecise "lasso" to outline the desired portion (which will include as a margin at least some of the background screen region). The user may enter a command to capture the outlined region and store it (i.e., store the red, green and blue pixel values) in a memory region. A lasso technique may be suitable when non-screen objects appear within the digitized image 40 in addition to the foreground subject 42. The captured image of the foreground subject 42 may hereinafter be referred to as a subject image 21.

If, on the other hand, the screen 44 is fairly uniform, and no non-screen objects appear in the digitized image 40 other than the subject, then a lasso tool may be unnecessary and the entire digitized image 40 may be considered the foreground subject 42. Such may be the case where a subject is being acquired in real time and may be moving with respect to the background screen, so that there is no opportunity to interactively select the foreground subject 42 on a computer screen or otherwise.

Once the foreground subject 42 has been acquired, the background sample selection step 6 is carried out. Selection of a background sample region 41 may be accomplished in a similar manner to selection of the foreground subject 42. The background sample region 41 may, for example, be captured by a lasso technique, or by interactively defining a box or arbitrary geometric shape over a portion of the background 44 using a tablet, mouse or other interactive device. The user may enter a command to capture the background sample region 41 and store it (i.e., store the red, green and blue pixel values) in a memory region. Alternatively, if lighting conditions and camera settings are known beforehand, a background sample region 41 may be selected from a digitized screen image having no foreground subject 42, or the entire area of the digitized image 40 may be used as the screen sample region 41 with no subject 42 present. The same background sample region 41, or data derived therefrom, may thereafter be used for other frames having similar known lighting conditions, camera settings and camera positioning.

The size of the screen sample region 41 may vary, but should be large enough to make meaningful the screen sample analysis step 8 detailed below. The background sample region 41 need not be a single contiguous region but may comprise a plurality of various regions of the screen 44. Once a screen sample region 41 is acquired, it may be used for a variety of subsequent frames so long as the screen itself does not significantly change. Thus, a foreground subject 42 may move relative to the screen in real time, and the same screen sample region 41 may be used for extraction and treatment processing of the foreground subject 42 as further described herein.

After the screen sample acquisition step 6, the screen sample analysis step 8 and fringe treatment step 10 are carried out. These two steps generally comprise four stages as shown in FIGS. 2A–2D. The four stages preferably involve, among other things, the creation of two control images useful for treating fringe regions of the foreground subject 42 to produce a treated subject image 30. Because the screen sample analysis step 8 and fringe treatment step 10 are closely related, they will be described below with respect to the four stages appearing in FIGS. 2A–2D rather than independently.

Figures 2A, 2B:
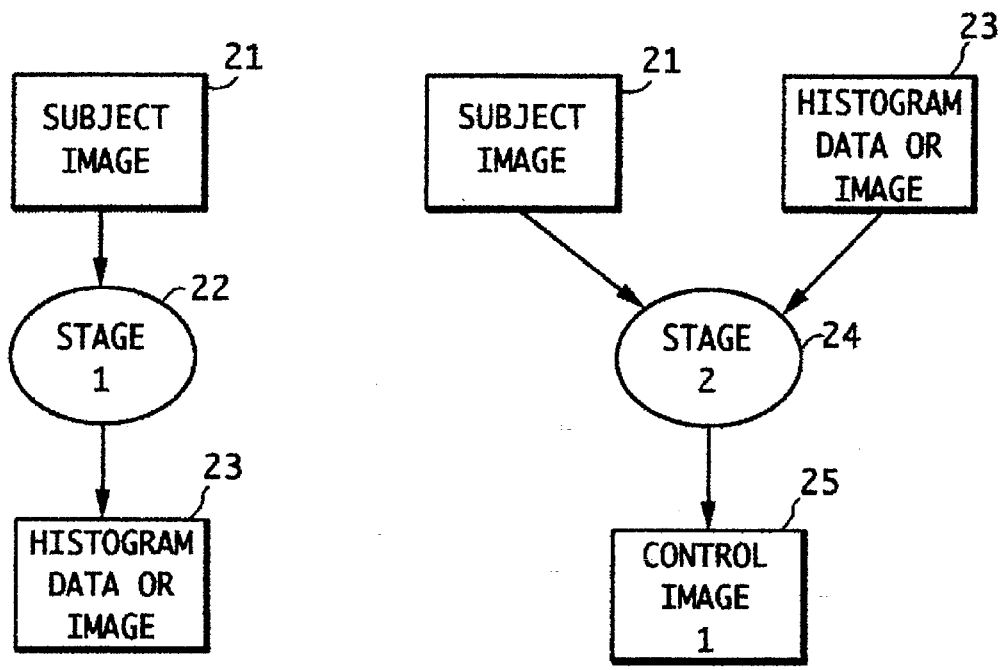
FIGS. 2A–2D are diagrams showing the input and output of four stages of processing in accordance with one embodiment of the present invention.
Figure 3B:
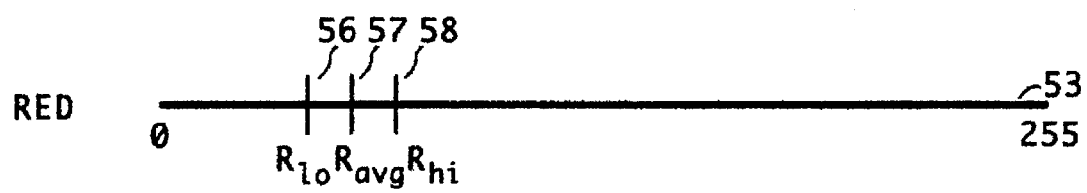
FIG. 3B is a diagram showing red, blue and green histogram data.
Figure 3B:
Figure 3B:
Figure 3C:
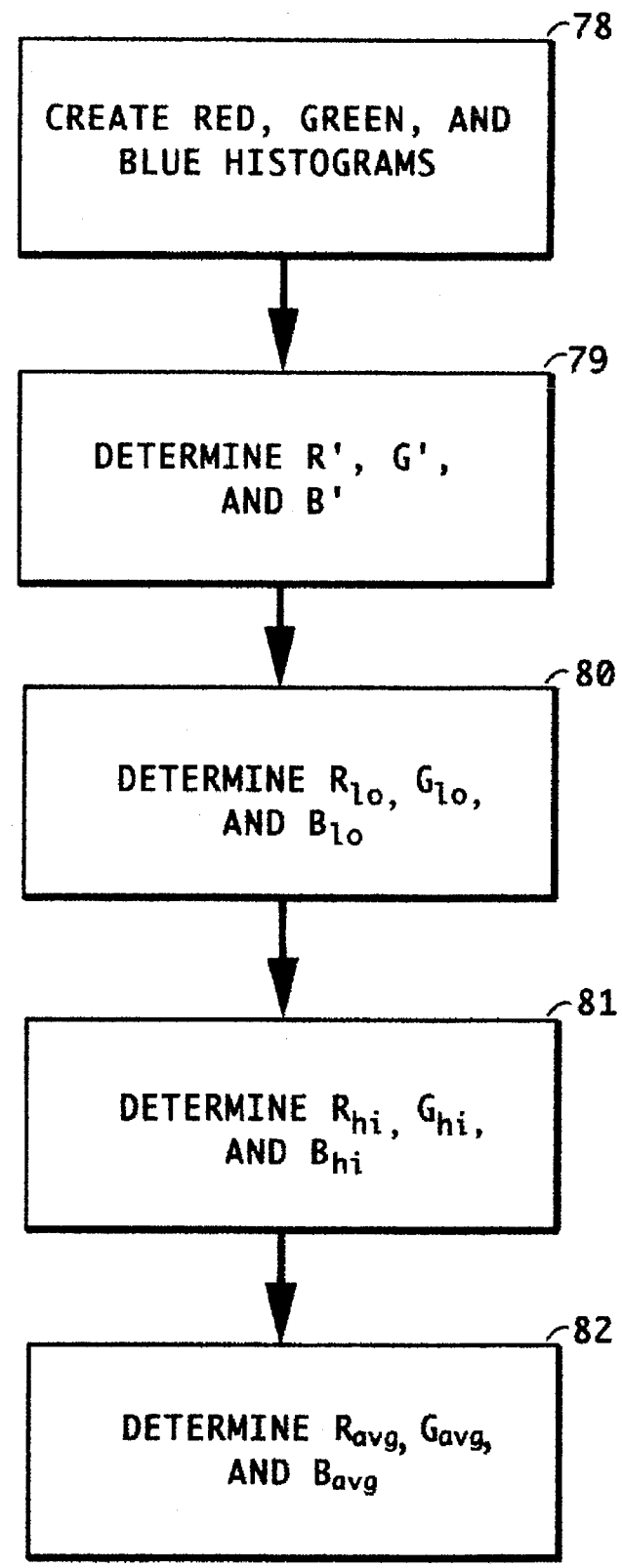
FIG. 3C is a block diagram illustrating the processing of histogram data.

In a first stage 22 shown in FIG. 2A, the subject image 21 is used as input to generate histogram data 23. FIG. 3C illustrates the process by which the histogram data 23 is derived, while FIG. 3D shows an example of a red histogram and FIG. 3B shows an example of histogram data. In a first step 78, a red histogram, green histogram, and blue histogram are generated from the pixel data obtained from screen sample region 41. FIG. 3D shows an example of a red histogram 70, while it is expected that the blue and the green histograms will look similar (although the main curve may differ in size or location). Each histogram 70 consists of consecutively numbered "bins", preferably 256 in number (arranged numerically 0 to 255), corresponding to color intensity. Thus, for example, bin 0 of the red histogram 70 corresponds to red pixels having a value of zero (i.e., having no red intensity whatsoever), while bin 255 of the red histogram 70 corresponds to red pixels of value 255 (i.e., having maximum red intensity). The pixels of the screen sample region 41 are analyzed serially, and the data from each pixel is used to increment the appropriate bin of the appropriate histogram 70. The result is a set of three histograms providing, as shown in a set of graphs in FIG. 3B, red histogram data 53, green histogram data 54, and blue histogram data 55, that contain information representing the frequency of each intensity for each of the three colors red, green and blue.

Preferably, for each pixel analyzed, the exact pixel intensities are not necessarily used but rather an average intensity of the pixel values in question and those of each of the eight surrounding pixels. In other words, as each red pixel value (for example) is considered, a 3×3 box filter is used to find the average red color value about the pixel in question, and the frequency of the bin number corresponding to the resulting red value is incremented by one. If desired, the intensity of the center pixel may be weighed more heavily than that of the surrounding pixels in order to obtain a weighted average instead of a straight average. For those pixels on the border of the screen region 41, the average color may be determined by simply looking to the immediate neighbors of a border pixel within the screen region 41, even if there are less than eight neighboring pixels. If the 3×3 box filter is not used, then the histogram data tends to have greater fluctuations and is less likely to produce a smooth "bell-shaped" or similarly shaped curve.

Theoretically, the data in the histograms 53, 54 and 55, which represent a statistical sampling of color intensities within screen sample region 41, will peak at a single bin location and steadily fall off toward a minimum value "N" on either side of the peak. In practice, it is most likely that the histogram data for each histogram 53, 54 and 55 will appear as a bell-shaped or similar curve having a single maximum, with the edges of the curve dropping to zero and remaining relatively flat to the ends of the histogram (i.e., N=0).

Once the three histograms 70 have been generated, step 79 is carried out whereby the bin with the highest frequency (i.e., the highest peak) for each histogram 70 is identified by scanning through each bin consecutively, setting a maximum frequency value (e.g., r' in the case of the red histogram) encountered thus far, and comparing r' to the frequency value of the current bin. After the maximum frequencies r', b' and g' have been determined in step 79, the nearest bin value below r' (referred to as "rlo") and above r' (referred to as "rhi") are determined at the point where the frequency value of the neighboring bins first falls below N, an arbitrary value (usually 0), which may represent the lowest frequency value in the particular histogram. Thus, rlo may be determined in step 80 by starting at the bin corresponding to r' and examining serially the neighboring consecutive bins below r' until one is reached whose frequency falls below N. The same procedure may be followed in the other direction in step 81 to determine rhi. Steps 80 and 81 are carried out in a similar manner to determine blo, glo, bhi and ghi.

In the unlikely event that two or more peaks of equal magnitude occur in a histogram 70, they will usually be very close (assuming that the screen is uniformly lit), and so one of the peaks may be chosen as the maximum. The choice may depend on the relative widths of the peaks (i.e., the wider the peak the more likely it represents the mainstream color of the screen 44), or based on any other appropriate factor. If there are multiple peaks exceeding the threshold level N, separated by a minimum that dips below N such that one or more peaks does not fall within the minimum and maximum range set above, then portions of the screen 44 may appear in the final composited image and it may be necessary to apply a touchup procedure as described later below.

FIG. 3B is an example of histogram data showing the relative positions of rlo, rhi, glo, ghi, blo, and bhi on axes representing the full range of red, green, and blue values. In the particular example of FIG. 3B, the screen sample region 41 would be comprised of a concentration of relatively high green intensified and relatively low blue and red intensities. The next step 82 is to calculate average histogram values ravg, gavg, and bavg from the corresponding low and high values. Thus:

$$ravg=(rlo+rhi)/2,$$

$$gavg=(glo+ghi)/2, \text{ and}$$

$$bavg=(blo+bhi)/2.$$

These average color intensity values are used for processing and treatment as described further below.

Instead of using simply one global average for each color (i.e., ravg, gavg and bavg), a more refined process may be carried out to get localized average color at each pixel. This process will only be carried out for background pixels, that is, pixels for which all of the following conditions are true:

$$rlo<r<rhi$$

$$glo<g<ghi$$

$$blo<b<bhi$$

where r, g and b are the color values of the particular pixel. For each pixel determined to be part of the background (i.e., by meeting the three above conditions), a local average value is arrived at by examining the surrounding background pixels within a specified area or kernel. A new set of histograms may be generated for the kernel, with the average of the minimum and maximum intensity calculated as described above, or an average may simply be calculated for the pixels within the kernel. In either case, a local average color is determined for each background pixel. These local average values may be used in place of ravg, gavg and bavg in the subsequent steps. Hereafter, it will be assumed that global average color values ravg, gavg and bavg may refer interchangeably to either local or global values, depending on whether this refinement was performed.

Once histogram data 23 has been established for a specific screen, lighting conditions, camera settings, and screen positioning, the histogram data 23 may be reused and the first stage 22 skipped for subsequent frames having a different foreground subject 42 or pose, while keeping the other conditions (i.e., the screen, lighting, camera settings and screen positioning) the same.

Figure 4:
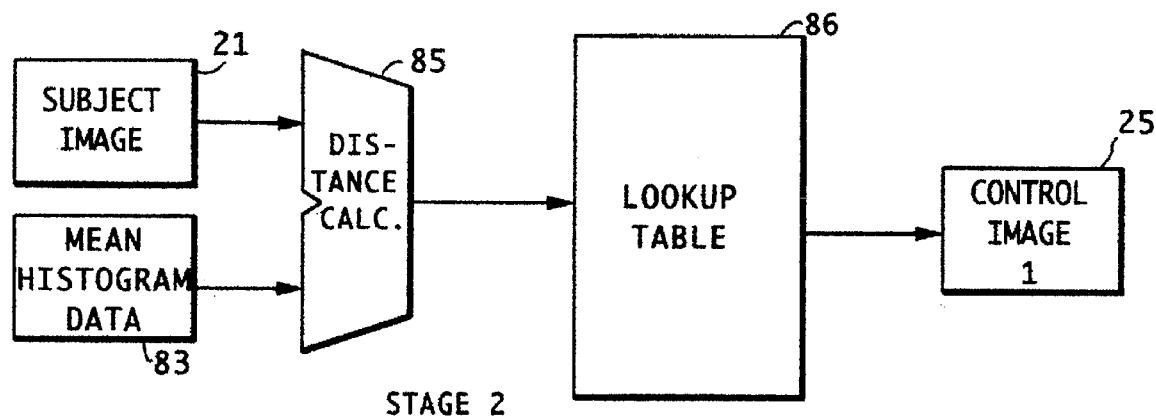
FIG. 4 is a functional diagram of Stage Two processing.
Figure 5:
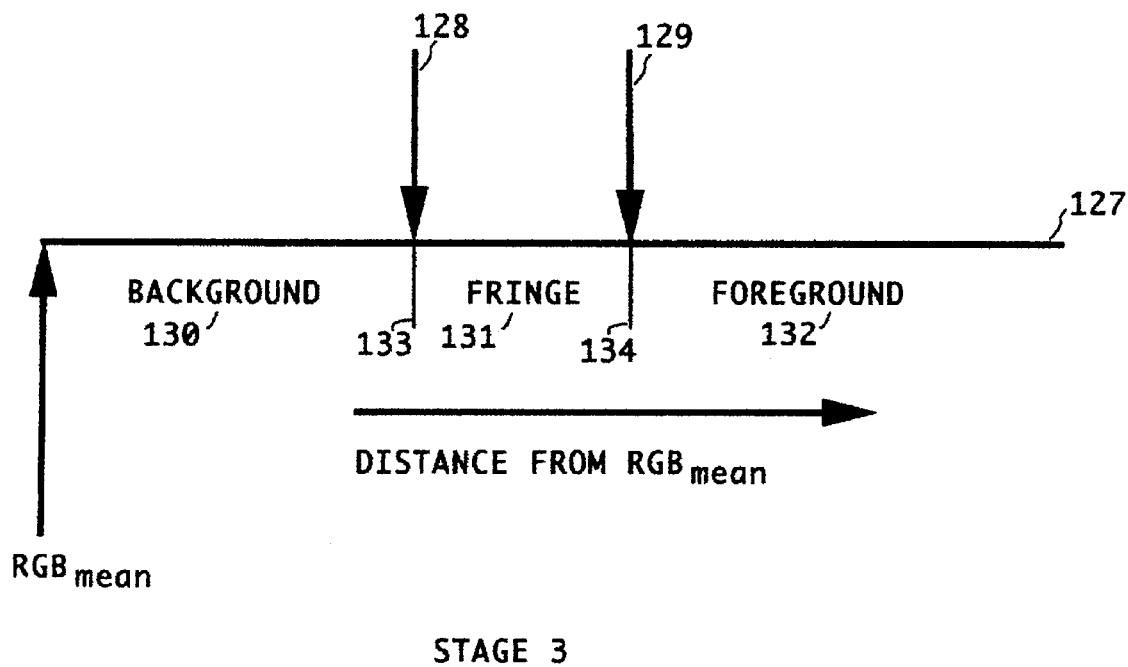
FIG. 5 is a diagram showing a separation of values of a control image into background, fringe and foreground regions.

Once the histogram data 23 represented in FIG. 3B has been generated, a first control image 25 may be generated in a second stage 24 as shown in FIGS. 2B and 4. The first control image 25 is basically a collection of values representing the "distance" in color between each pixel and the average screen colors ravg, gavg and bavg, be they local or global. Thus, as shown in FIG. 4, pixel data from the subject image 21 and the mean histogram data 83 (i.e., ravg, gavg and bavg) are used as the basis for a distance calculation 85 to generate the first control image 25. FIG. 4 depicts what may be called an "image processing engine" (previously documented in Disclosure Document No. 338968) which acts upon each pixel in the subject image 21 and performs the following calculation:

$$[(r-ravg)^2+(g-gavg)^2+(b-bavg)^2]^{1/2}$$

The result of the above calculation is stored in the corresponding location in the first control image 25. Thus, the control image 25 may be viewed as a two-dimensional array comprised of color distance values for each pixel of the subject image 21. The first control image 25 need only be large enough to cover the subject image 21.

Figure 8:
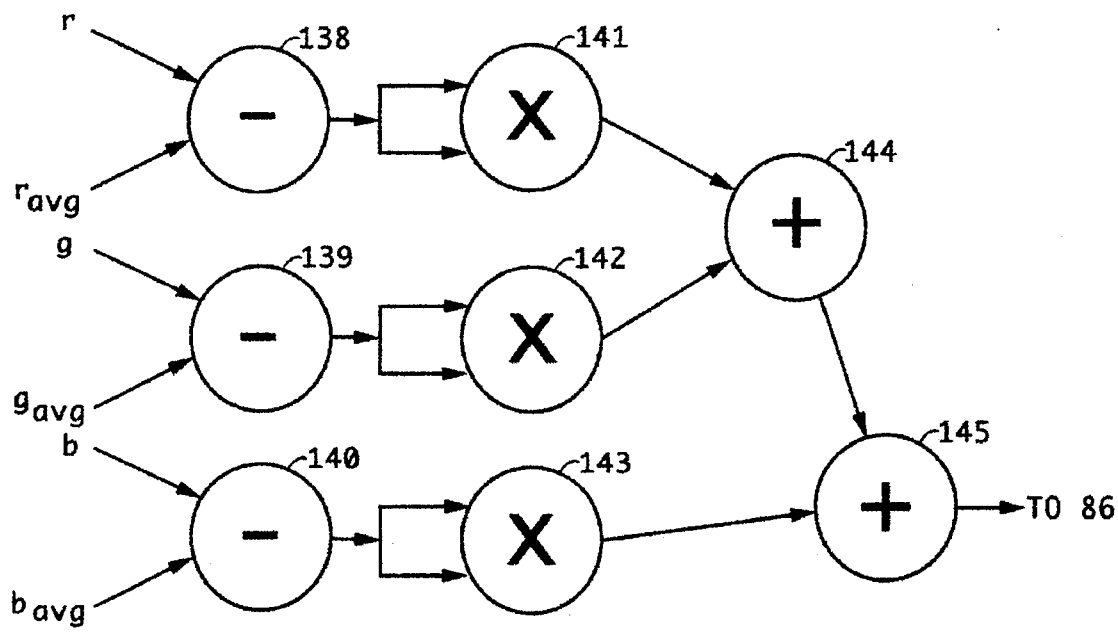
FIG. 8 is a functional diagram of Stage Two processing.

FIG. 8 is a data flow diagram detailing processing hardware which may be used to generate the first control image 25. Subtractors 138, 139 and 140 may calculate the difference between the r, g, and b values of a particular pixel and the average histogram values (either global or local). Multipliers 141, 142, and 143 may calculate the square of each of the r, g, and b differences, and adders 144 and 145 may sum the resulting squared values together to arrive at a raw distance value between 0 and 65,535. The upper 16 bits of the raw distance value (assuming binary representation) may be used as an index for a 65,536-entry lookup table 86 which contains entries corresponding to the square root of the index, in order to generate a distance value in a range between 0 and 255. The distance value is then stored in the first control image 25 at a location corresponding to the pixel from the subject image 21. The calculations shown in the data flow diagram of FIG. 8 may be implemented by an integrated chip especially tailored for digital signal processing (DSP), which may comprise subtractors, multipliers and adders on a single integrated chip or several integrated chips, or may be implemented by similar pipelined architecture. Of course, the calculations described in FIG. 8 may be implemented in software as well.

Rather than generating a square root, the lookup table 86 may alternatively implement a higher order root function in order to increase the distribution of values in the neighborhood of zero, since these values occur in the area known as the "fringe" which is the focus of further processing detailed below. The preferred embodiment presently uses a square root.

Figures 2C, 2D:
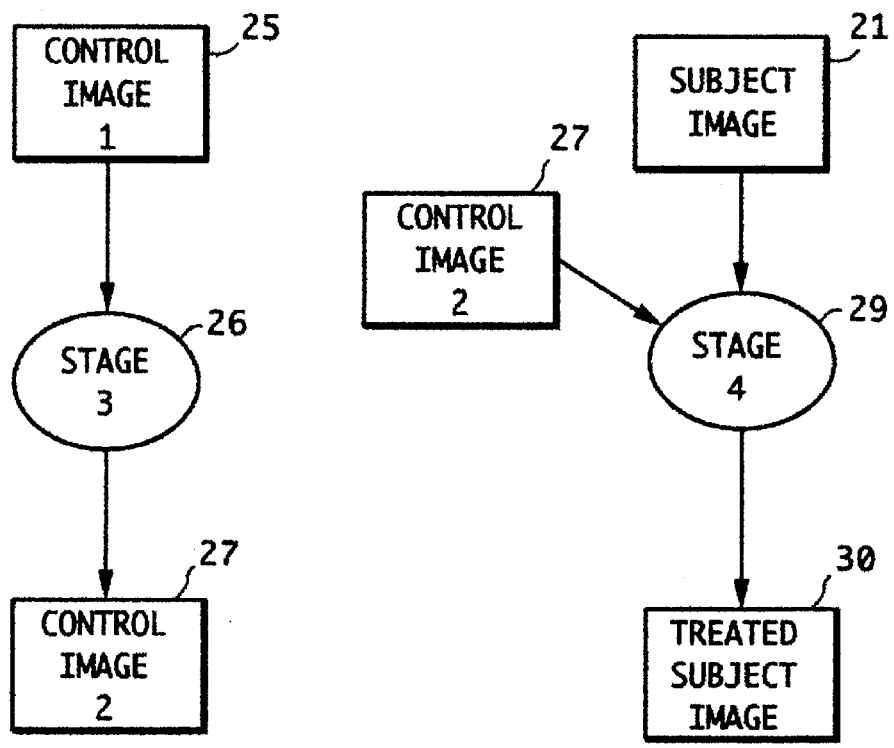

After the first control image 25 is generated, a second control image 27 may be generated in a third stage 26 as shown in FIG. 2C. In order to generate the second control image 27, the range of values stored in the first control image 25 may be broken into three regions. FIG. 4 illustrates a division of the range of values 127 stored in the first control image 25 into three regions corresponding to a background region 130, a fringe region 131, and a foreground region 132. The background region 130 and the fringe region 131 are separated at a frontier 133, and the fringe region 131 and the foreground region are separated at a frontier 134. A first slider control 128 may be used to adjust the location of the frontier 133 separating the background region 30 and the fringe region 31. Likewise, a second slider control 129 may be used to adjust the frontier 134 separating the fringe region 131 and the foreground region 132. The slider controls 128 and 129 may be implemented so as to be adjusted interactively by using a grey scale or color framebuffer lookup table to display the range of values 127 from the first control image 25. Assuming that pixel values within the first control image 25 range from 0 to 255, slider controls 128 and 129 may represent values ranging from 0 to 255 as well.

The positions of the slider controls 128 and 129 may be periodically sampled as they are interactively adjusted. As each slider position is sampled, the grey scale lookup table is updated as follows: all values below frontier 133 are assigned a lookup value of 0 (black); all values between frontier 133 and frontier 134 are assigned grey scale lookup values between 0 and 255 (using an interpolation method described below); and all values above frontier 134 are assigned lookup values of 255 (white). Interpolation for values between frontier 133 and 134 may be carried out using the following formula:

$$gsv = 255 \times (cl-lo)/(hi-lo)$$

where "cl" is the value stored in the first control image 25, "lo" is the value (between 0 and 255) of the lower slider control 128, "hi" is the value of the higher slider control 129, and "gsv" is the resulting grey scale value. The effect of the above interpolation is to expand a relatively small range of "grey" values in the fringe region 131 to a wider spectrum of grey values ranging from 0 to 255. If the first control image 25 consists of fixed point 16-bit values, then resolution is not sacrificed when this expansion occurs.

Figure 6:
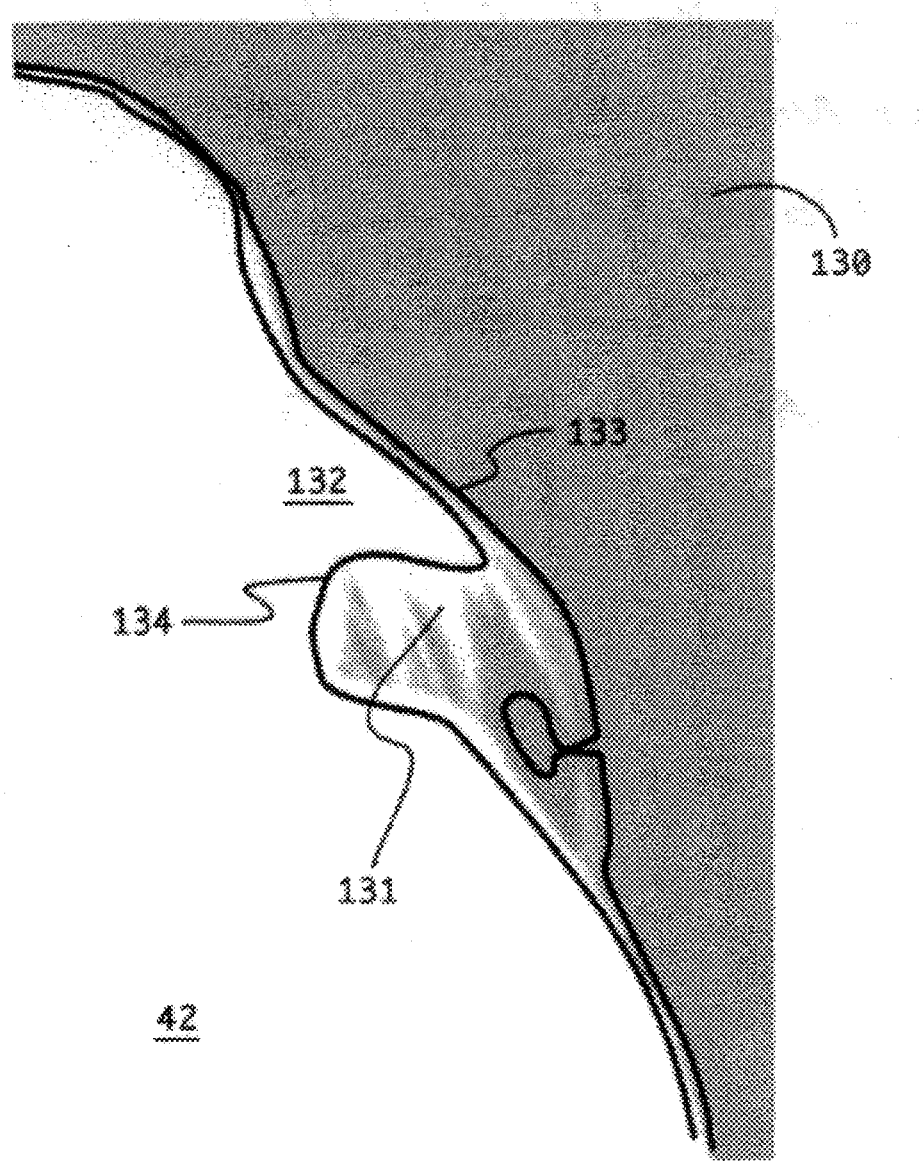
FIG. 6 is a processed image having a frontier region.

As the grey scale lookup table is updated, the subject image 21 may be viewed on a screen and may be simultaneously updated as well. FIG. 6 shows an example of a digitized foreground subject 42, in this case a portion of a female head that was shot in front of a colored screen, digitally extracted according to the above described methods and operated upon by slider controls 128 and 129. As can be seen in FIG. 6, slider controls 128 and 129 have been adjusted so that the bulk of the foreground subject 42 (appearing as all white) lies in the foreground region 132, the boundaries of the subject's hair lie in the fringe region 131, and the colored screen (appearing as all black) lies in the background region 130. The frontier 134 between the foreground region 132 and the fringe region 131 has been highlighted for clarity, as has the frontier 133 between the fringe region 131 and the background region 130. The frontiers 133 and 134 may move in an appropriate direction as sliders 128 and 129 are adjusted interactively to reflect the expansion or shrinking of the background region 130 and foreground region 132.

Figure 9:
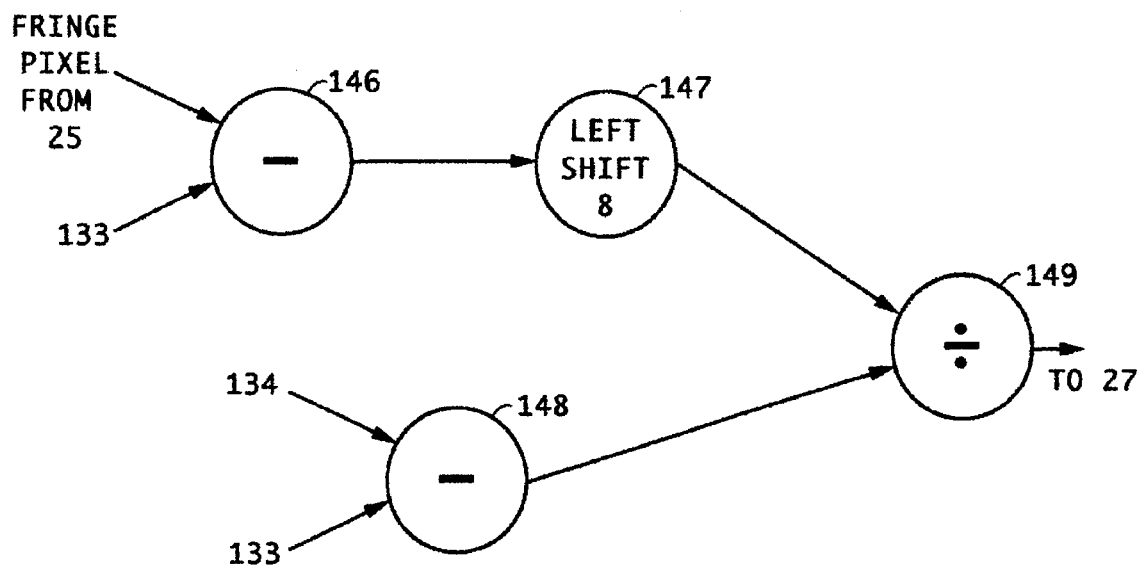
FIG. 9 is a functional diagram of Stage Three processing.

FIG. 9 is a dataflow diagram illustrating processor operations which may be used for interpolating values between frontiers 133 and 134 as described above. A subtractor 146 calculates the difference between the pixel value stored in the first control image 25 and the lower frontier 133. A shifter 147 shifts the output of the subtractor 146 left 8 bits, essentially multiplying the scalar value of by 256. Another subtractor 148 calculates the difference between the two frontiers 133 and 134 (which difference may be stored for subsequent operations on the same image so as to reduce the number of calculations carried out), and a divider 149 divides the output of the shifter 147 by the output of the subtractor 148, producing a resulting grey scale value.

The interpolated grey scale values are used in at least two ways. First, they are used to update the grey scale lookup table and the displayed image as the slider controls 128 and 129 are adjusted as previously described. Second, the interpolated grey scale values are stored in the second control image 27. As with the grey scale lookup table, pixels falling in the background region 130 pixels are assigned a value of 0 in the second control image 27, while pixels falling in the foreground region 132 are assigned values of 255 within the second control image 27. The second control image 27 is preferably not generated until the slider controls 128 and 129 have been properly adjusted and the user indicates satisfaction with the displayed image.

The positioning of the slider controls 128 and 129, which adjust the frontiers 133 and 134, may be important for maintaining the quality of the final image. Thus, if the lower frontier 133 extends too far into the background region 130, then parts of the background screen may appear as translucent areas in the foreground subject 42 when a final composite is generated. If the lower frontier 133 extends too far into the fringe region 131, then important translucent areas of the foreground subject 42 (in the present example, portions of the subject's hair) may not appear in the final composite. If the upper frontier 134 extends too far into the fringe region 131, then parts of the foreground subject 42 which should appear sparse or translucent may appear too thick or opaque in a final composite. If the upper frontier 134 extends too far into the foreground region 132, then parts of foreground subject 42 which should appear opaque will appear translucent or transparent in a final composite. It should also be noted that the second control image 27 may contain small patches of grey in the region corresponding to the foreground subject 42 if the foreground subject 42 contains coloration overlapping with that of the background 44. The positioning of slider controls 128 and 129 may also be reused on similar subject images or "frames" in a sequence of images.

After the second control image 27 has been generated, a treated subject image 30 may be generated in a fourth stage 29 as generally shown in FIG. 2D. This process will be described with reference to FIGS. 7 and 10–12. In general, the fourth stage 29 involves a process whereby the fringe pixels of the subject image 21 are recolored using pixel data from the subject image 21 and the second control image 27.

Figure 11:
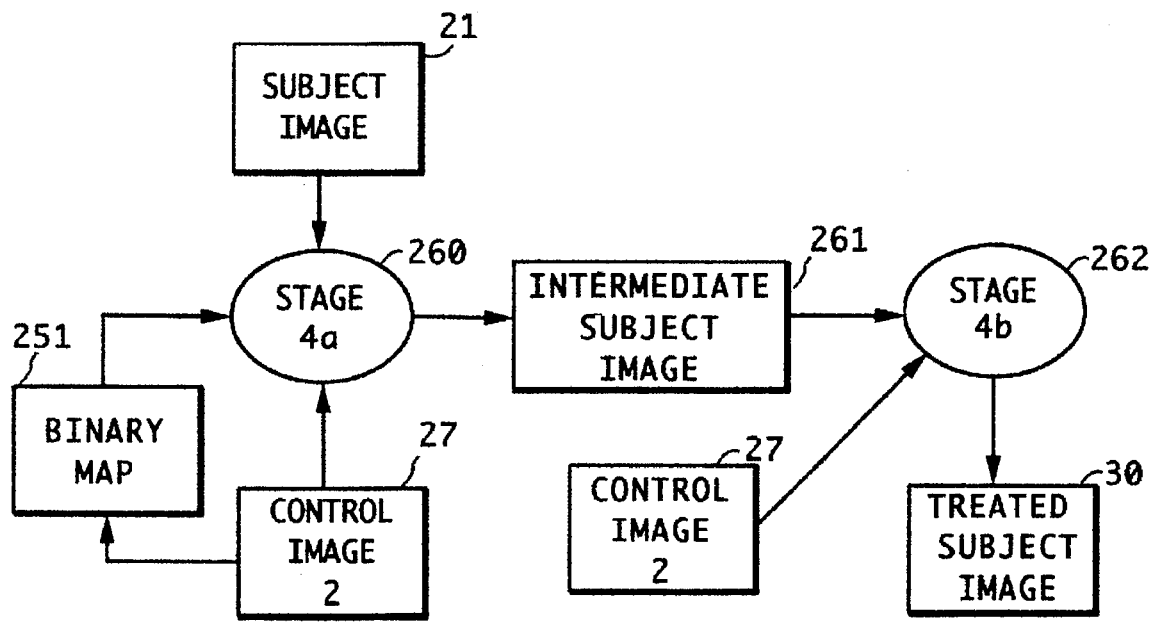
FIG. 11 is an overview diagram of Stage Four processing.

The fourth stage 29 may be broken down into two sub-stages 260 and 262 as shown in FIG. 11. In the first sub-stage 260, an intermediate subject image 261 is generated by processing data from the subject image 21, the second control image 27, and a binary map 251. The intermediate subject image 261, as explained in more detail below, will be generated so as to contain unique red, green and blue ("rgb") color pixel data associated with each pixel within the fringe region 131; the intermediate subject image 261 need not contain information pertaining to non-fringe pixels (i.e., those pixels within the foreground region 132 or background region 130). In the second sub-stage 262, the treated subject image 30 is generated by processing data from the intermediate subject image 21 and the second control image 27.

Figure 10:
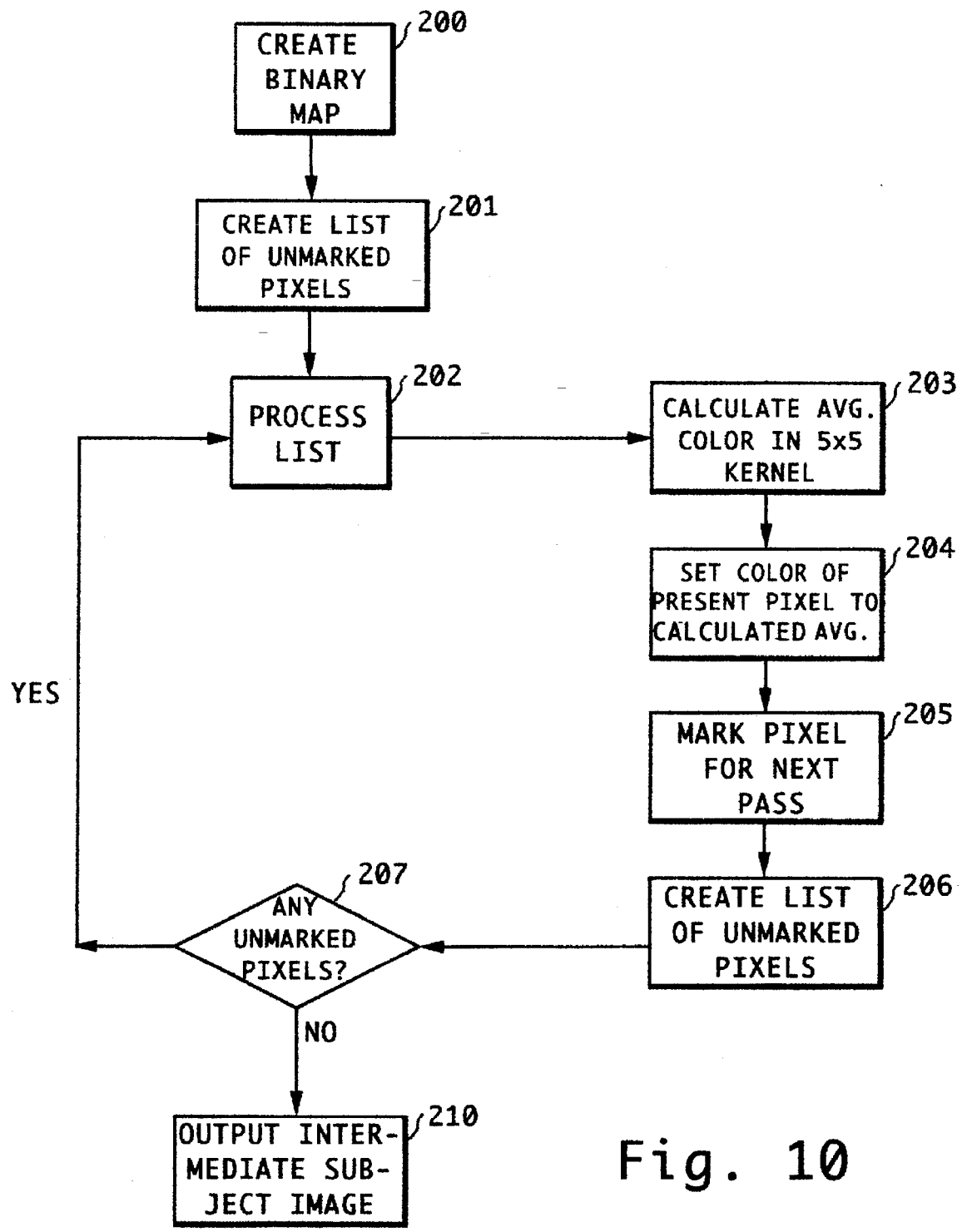
FIG. 10 is a flow diagram for generating a treated image by use of a control image.

The processing carried out in the fourth stage 29 is shown in more detail in the flow diagram of FIG. 10. In a first step 200, a binary map 251 is generated. The binary map 251 comprises a bi-level or binary image for the purpose of facilitating generation of the intermediate subject image 261. Each pixel of the second control image 27 may have a corresponding bit in the binary map 251. The bit is set to a first value (e.g., 0) if the pixel is "marked" or a second value (e.g., 1) if the pixel is "unmarked". Initially, all pixels located in the background region 30 of the second control image 27 are considered marked and all other pixels are considered unmarked. Thus, the binary map 251 starts out having all 0's at locations corresponding to the background pixels and having all 1's at locations corresponding to the foreground and fringe pixels.

Figure 7:
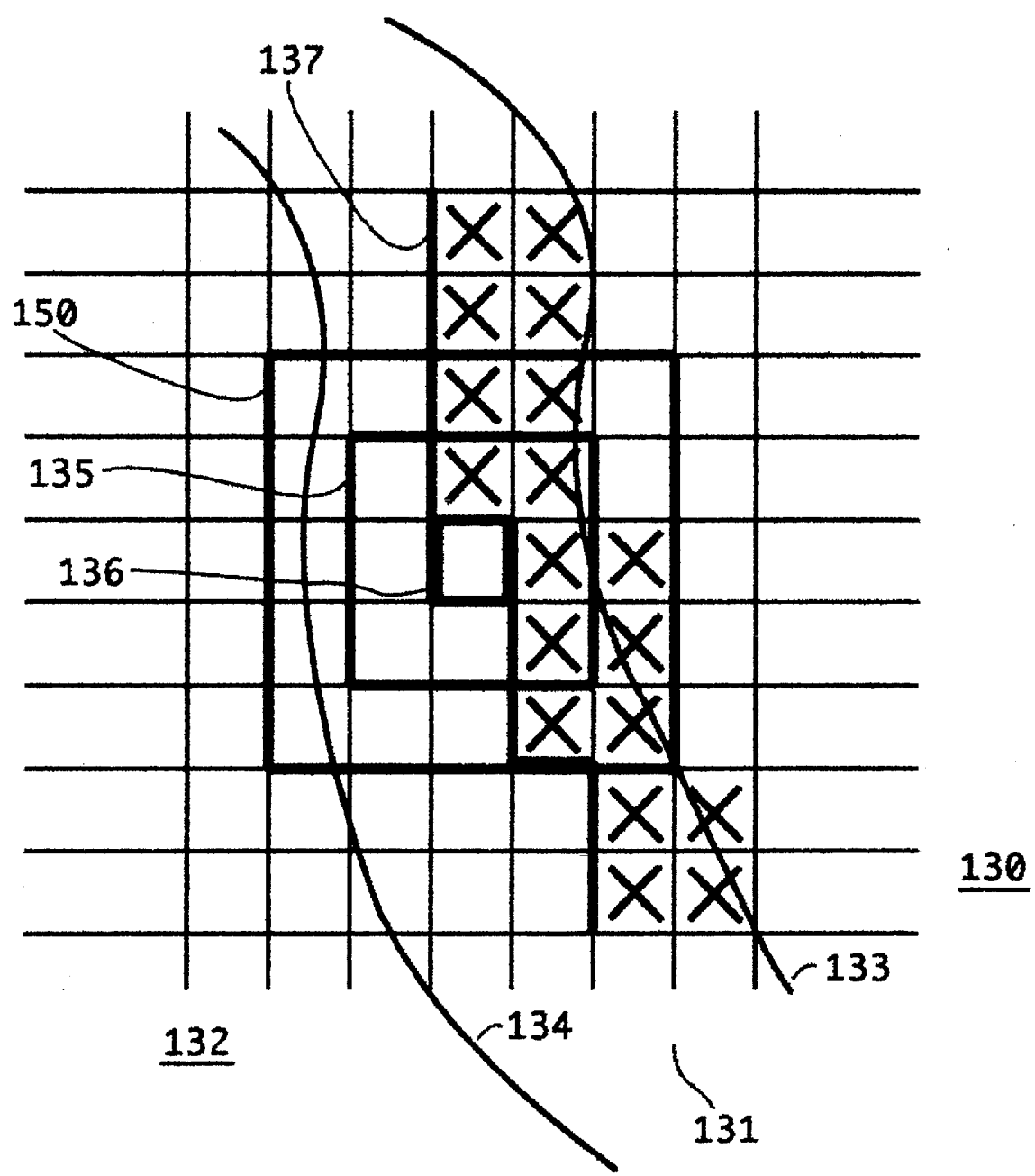
FIG. 7 is a diagram of pixels in a local fringe region contained within various morphological kernels.

The next step 201 is to generate a list of unmarked pixels meeting certain criteria from the binary map 251. Processing occurs in several passes, and at each pass a new list is generated until no unmarked pixels within the fringe region 131 remain. Each unmarked pixel within the fringe region 131 of the binary map 251 having a marked neighbor within a 3×3 kernel is added to a list. FIG. 7 shows this process in more detail. FIG. 7 shows a region of pixels corresponding to the same portion of the binary map 251, the second control image 27, and the intermediate subject image 261. The region of pixels is divided into a background region 130, a fringe region 131, and a foreground region 132, which regions are divided as before at frontiers 133 and 134. For pixels overlapping both the background region 130 and the fringe region 131 (i.e., the line of the frontier 133 passes through the pixel), such pixels are considered unmarked for purposes of the binary map 251. Each unmarked pixel 136 in the binary map 251 is processed by a 3×3 kernel 135. In FIG. 7, it is assumed that some processing has already occurred (reaching a border 137), and that those pixels in fringe region 131 having an "x" have become marked under the algorithm explained further herein. Thus, for example, because pixel 136 is surrounded by at least one marked pixel within the perimeter of the 3×3 kernel 135, the pixel 136 is added to a list for processing in the present pass. The list is complete when all unmarked pixels have been examined using the 3×3 kernel 135.

Once the list of unmarked pixels bordered by marked pixels has been generated, the next step 202 is to process the list. The list processing step 202 comprises a number of additional steps 203 through 206. For each unmarked pixel in the list, the average color of all the marked pixels within the perimeter of a 5×5 kernel 150 is calculated as follows:

$$Ravg = (\Sigma ri)/n$$

$$Gavg = (\Sigma gi)/n$$

$$Bavg = (\Sigma bi)/n$$

where n is the number of marked pixels within the 5×5 kernel 150, ri, gi, and bi are the red, green and blue color values of each consecutive marked pixel within the 5×5 kernel 150 (excluding the center pixel 136 because it is unmarked), and Ravg, Gavg and Bavg are the calculated average color values for red, green and blue, respectively. In the next step 204, the average color values Ravg, Gavg and Bavg are stored in the appropriate location in the intermediate subject image 261 for later processing. Thus, the localized background color is "leaked" into the fringe region 131 of the intermediate subject image 161 in a series of discrete steps.

In the following step 205, the pixel 136 is marked in the binary map 251 such that it will not need to be processed in the following pass (but it is still considered as an unmarked pixel for the remaining unmarked pixels in the current list). Once all the unmarked pixels on the list have been so processed, a new list of unmarked pixels bordered by marked pixels may be generated in the same manner as before. If no unmarked pixels remain, as determined in decision block 207, then generation of the intermediate subject image 261 is complete, and the intermediate subject image 261 may be provided to the next processing phase as shown in step 210.

Preferably, the generation of lists is optimized by allowing for dynamic generation of a subsequent list while the present list is being processed. Thus, as each unmarked pixel in the fringe region 131 is being analyzed with a 3×3 kernel 135, the unmarked pixels (other than the center pixel) within the 3×3 kernel 135 which are not on the current list may be added to a second list for subsequent processing. Such unmarked pixels may be processed on the next list because it is known that the center pixel 136 will be marked on the present pass, and consequently the unmarked pixel will have at least one marked neighbor at the end of the present pass. However, if the unmarked pixel has a marked neighbor outside of the 3×3 kernel 135, then it will be added to the present list when it is eventually processed by the 3×3 kernel 135 (if it has not been so added already), and thus it will need to be removed from the second list.

After no unmarked pixels remain in the fringe region 131, the intermediate subject image 261 contains unique rgb color pixel data associated with each pixel within the fringe region 131. Non-fringe pixels (i.e., those pixels within the foreground region 132 or the background region 130) need not comprise a part of the intermediate subject image 261. The intermediate subject image 261 thus is basically an image of the fringe region 130 into which has been leaked localized background color from the background region 130.

Once the intermediate subject image 261 has been generated, the treated subject image 30 may be created as shown in the second sub-stage 262 of FIG. 11. In the treated subject image 30, the color of the pixels corresponding to the foreground region 132 of the second control image 27 are set to be the same as the color as the corresponding pixels of the subject image 21. In other words, for each pixel in the foreground region 132 of the second control image 27, the color from the subject image 21 is stored in the corresponding pixel location in the treated subject image 30. The pixels within the background region 130 are ignored for purposes of the treated subject image 30. For pixels within the fringe region 131 of the second control image 27, the color value in the treated subject image 30 is based on the following formula (calculated separately for each of the red, green and blue colors):

$$TI = [(256/CI2) \times (SI - IM)] + IM$$

where "CI2" is the color value for the second control image 27, "SI" is the color value for the subject image 21, "IM" is the color value for the intermediate subject image 261, and "TI" is the resulting value to be used for the treated image 30. The (SI–IM) term in the above equation represents the removal of the localized background color from the subject image. The (256/CI2) term is a translation factor applied to restore proper resolution. The addition of IM at the end of the formula is to restore the background color after translation. Thus, the foreground color from the subject image 21 is extrapolated into the fringe region 131, given the surrounding screen color as the prevalent screen color within the fringe region 131. For 8-bit data values, the TI value is clipped to between 0 and 255.

Figure 12:
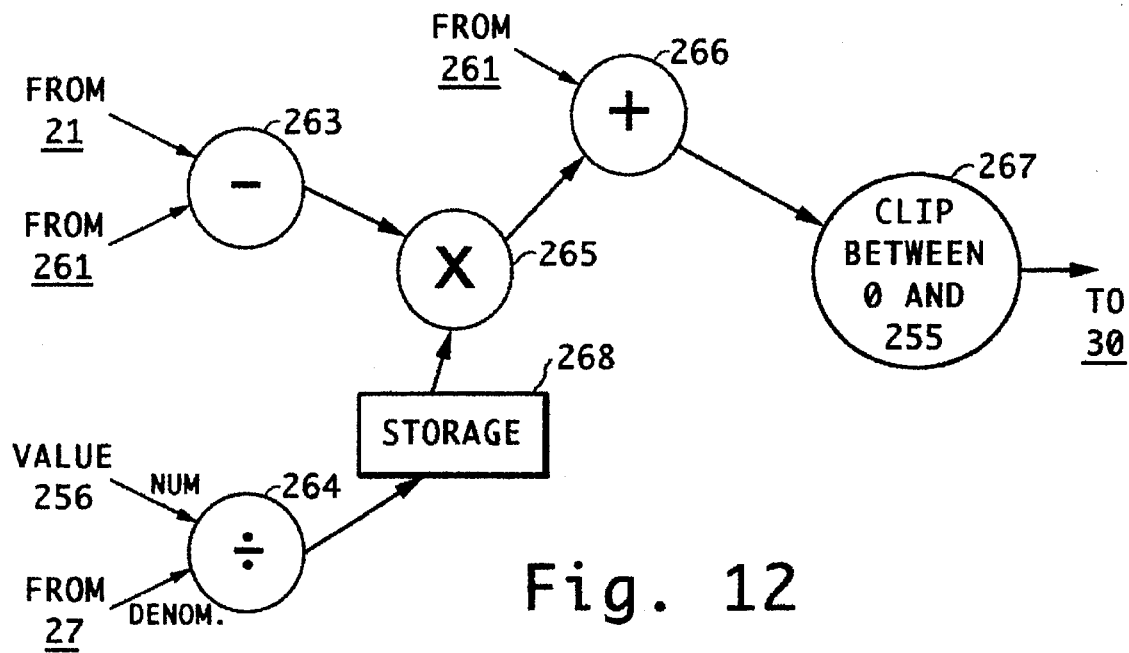
FIG. 12 is a functional diagram of Stage Four processing.

FIG. 12 is a data flow diagram detailing processing hardware which may be used to generate the treated subject image 30 according the method described above. For each pixel in the fringe region 131, the scaler value 256 is divided by the grey scale value of the appropriate pixel from the second control image 27 by a divider 264. The output from divider 264 is buffered in a memory 268 for subsequent processing. Each of the red, green, and blue color values are processed. Thus, the red value from the appropriate pixel of the intermediate subject image 261 is subtracted from the red value of corresponding pixel of the subject image 21 using subtractor 263. The output of subtractor 263 is multiplied by the value in buffer 268 using multiplier 265. The output of the multiplier 265 is added back to the red value from the corresponding pixel of the intermediate subject image 261 using adder 266. The output of adder 266 is clipped to fall between 0 and 255 inclusive using clipper 267, whose output is stored in the appropriate location of treated subject image 30. The same process is duplicated for the blue and green values of the current fringe pixel, using the same buffered value stored in 268 if desired. The steps are repeated until all pixels in the fringe region 131 have been processed.

The result of the processing in the fourth stage 29 is a treated subject image 30 having a colored foreground, a colored fringe region, and a background which is ignored.

After the treated subject image 30 is generated, it may be composited with an arbitrary background image as noted in step 12 of FIG. 1. The treated subject image 30 may be processed using global recoloring operations in order to color correct the subject of the acquired image so as to match the background of the new image when it is composited. The actual compositing operation may be performed using techniques well known in the art such as, for example, the methods described in U.S. Pat. No. 4,602,286 entitled "Video Processing for Composite Images" (issued Jul. 22, 1986), or detailed in T. Porter and T. Duff, "Compositing Digital Images," *Computer Graphics Journal*, Vol. 18, No. 3, July 1984. One method known as alpha channel compositing makes use of the formula:

$$result = a \times fg + (1-a) \times bg$$

where a is an alpha channel value, fg is a foreground color, and bg is a background color at a given pixel. In essence, the result is the foreground color if the alpha channel value is 1, the background color if the alpha channel is 0, or some ratio of the two if the alpha channel is a fraction between 0 and 1. If alpha channel compositing is used to composite the treated subject image 30 with a background image, then the second control image 27 may act as the "alpha channel" (after normalizing by the scalar value of 256 in the case of 8-bit color data) for generating the composite image. Thus, where the normalized second control image has a value of 0, then the color of the particular pixel in the composite image will be that of the selected background image; where the normalized second control image has a value of 1, then the color of the particular pixel in the composite image will be that of the treated subject image 30; and where the normalized second control image has a value between 0 and 1, then the color of the particular pixel in the composite image will be some mixture of background and foreground color as given by the alpha channel equation above.

After a composite image has been generated, a touch-up step 14 may be carried out as shown in FIG. 1. Touch-up may be desired at certain fringe areas of the composite where frontier 134 was extended too far into the background screen area of the image outside of the subject area 12. Such a situation may cause a colored border to appear at the fringe area in question.

Figure 13:
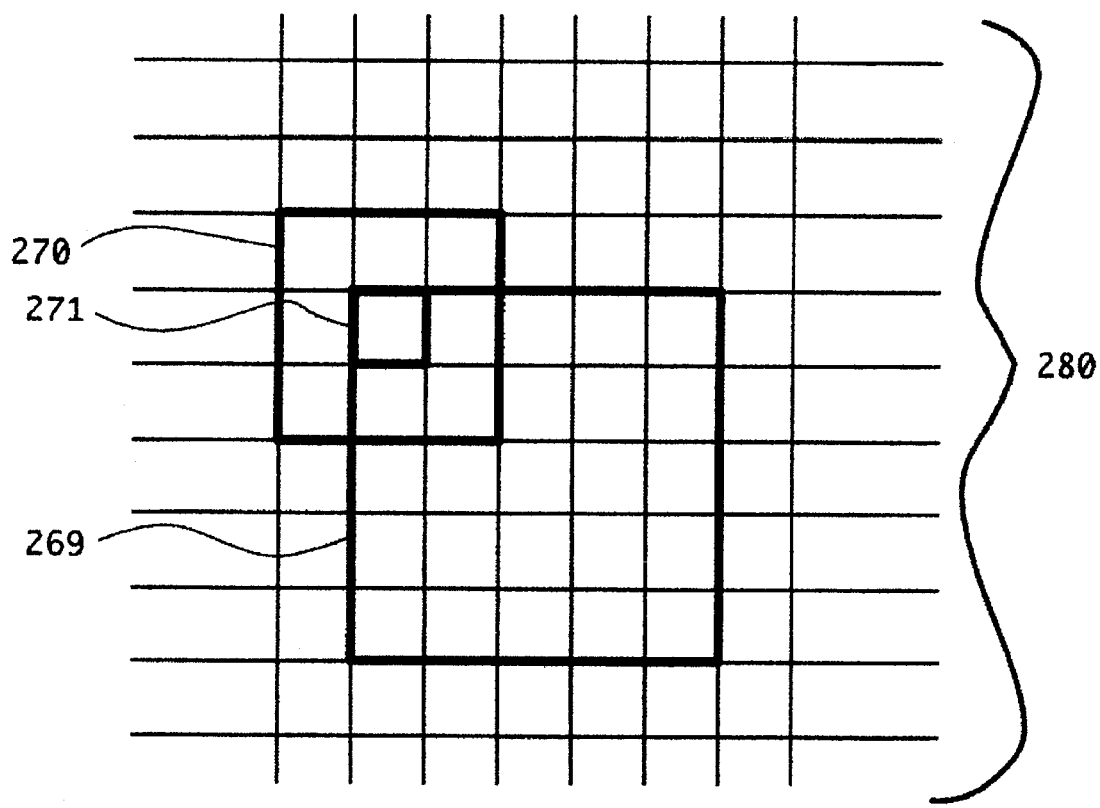
FIG. 13 is a pixel diagram showing the operation of a touchup brush utilizing filter kernels.

The touch-up step 14 may be described with reference to FIG. 13, which illustrates a brush 269 of selectable size operating in conjunction with a 3×3 filter kernel 271. Touch-up may be carried out interactively with the composite image displayed on a terminal. The brush size may be defined or selected interactively by a user. Once a brush 269 is selected, the brush 269 may be passed over a region of the composite image 280 requiring touch-up. A filter kernel 270 is passed over each pixel 271 within the boundary of the brush 269 (although a 5×5 square brush is shown, a brush of any suitable size and shape may be used). For each pixel over which the filter kernel 270 passes, certain processes are carried out as described further below.

Figure 14:
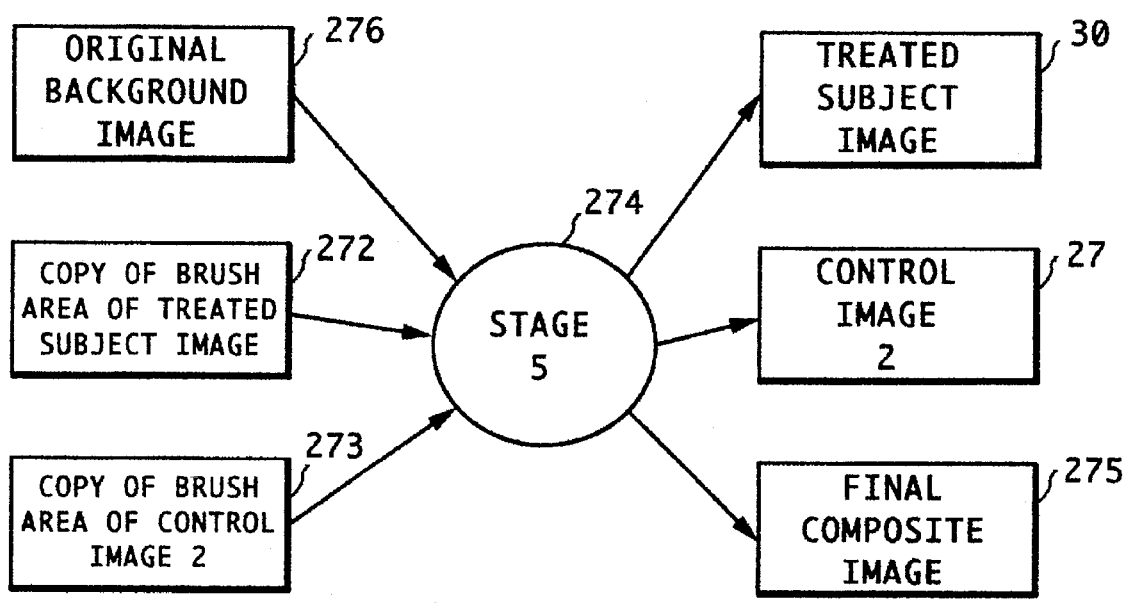
FIG. 14 is a flow diagram of touchup processing.

The process generally requires at least the use of the treated subject image 30, the second control image 27, the original background image 276 (i.e., the background against which the treated subject image 30 was composited), and the composite image 280. To facilitate processing, a copy of the brush region (with an additional margin of two pixels in each direction) from the treated subject image 30 and the second control image 27 may be copied into temporary memory areas such as a first temporary memory area 272 and second temporary memory area 273, respectively, as shown in FIG. 14. During the touch-up stage 274 of processing, as the filter kernel 270 is passed over each pixel 271 of the brush area 269, new pixel values will be generated in the treated subject image 30, the second control image 27, and the final composite image 275.

For each pixel 271 so processed, if the pixel 271 lies within the fringe region 131 (i.e., the corresponding value in the second control image 27 is greater than 0 and less than 255), and the pixel 271 is bordered by at least one pixel falling within the background region 130 (i.e., having a value in the second control image 27 of zero), then the new value of the corresponding location in the second control image 27 is set to 0 and the color value of the pixel 271 in a final composite image 275 is set to the color value of the pixel in the original background image 276.

If the pixel 271 lies within the fringe region 131 and is not bordered by at least one pixel within the background region 130, then some amount of local foreground color is leaked into the pixel 271. The following steps take place in precisely the described sequence:

(a) The grey value in the second control image 27 is multiplied by a coefficient of ½ (or some other suitable predetermined fraction) in order to generate a new grey value at the corresponding location in the second control image 27;

(b) The treated subject image 30 is updated by adding foreground color in a manner similar to the recoloring of the fringe region 131 in the fourth stage 19 of processing; thus, pixel 271 is treated like the unmarked pixels in the fourth stage 29 of processing (e.g., such as pixel 136 in FIG. 7), and the process as shown in and described with respect to FIG. 12 for calculating pixel values for the treated subject image 30 is duplicated in order to generate new red, blue and green color values for the pixel 271 within the treated subject image 30, except that only the color of the surrounding foreground (not background) pixels are used (if there are no foreground pixels, then no color is leaked into the pixel 271); and (c) The grey value at the corresponding location of the second control image 27 is applied as the "alpha" value to recolor the corresponding pixel using the treated subject image 30 for the foreground color and the original background image 276 for the background color to generate a new pixel color in the final composite image 275.

If, on the other hand, the pixel 271 lies within the foreground region 132 (i.e., its value within the second control image 27 is equal to 255) and is bordered by at least one pixel within the fringe region 131, then the processes described in paragraphs (a) through (c) immediately above are applied to this pixel as well, essentially changing it to a fringe pixel such as those within region 131.

If the pixel 271 does not satisfy any of the above three criteria, then the pixel 271 is ignored for the particular brushstroke.

As the color pixel values within the final composite image 275 are modified by the touch-up stage 274 of processing, these color pixel values are also copied into a display buffer for interactive display of the final composite image 275 or, if desired, only the particular area of the final composite image 75 being modified. The brush 269 may be moved in any direction as desired in the composite image 280 by use of an interactive input device such as a stylus, pen, mouse, or similar device. As the brush is moved by at least one pixel coordinate in any direction, copies of brush memory areas 272 and 273 are regenerated, and the touch-up stage 274 of processing is repeated. Touch-up is finished when the user is satisfied with the quality of the final composite image.

The described system thus provides for interactive processing of the seam of a composite in order to eradicate the original screen color. The amount of color to be removed may be controlled by both the number of passes of the brush, or by the magnitude of the coefficient described in step (a) above for generating a new grey value at the appropriate pixel location in the second control image 27. The described system may be used in conjunction with conventional stencil brushes or inverted stencil brushes.

Alternate Embodiments

While the invention has been particularly shown and described with reference to certain embodiments, it will be understood by those skilled in the art that various changes in form and detail may be made without departing from the spirit and scope of the invention.

What is claimed is:

1. A method for extracting a digitized foreground image for compositing with an arbitrary background image, said method comprising the steps of:

acquiring an image comprising a foreground subject and a background, obtaining data representing coloration of said background, said data comprising a plurality of values corresponding to color intensities, generating from said data a statistical range of color intensities for each of a selected group of colors, deriving an indication of average background color from said statistical range of color intensities, differentiating said foreground subject from said background by comparing color intensity values of said foreground subject with said indication of average background color, generating a control image comprised of values representing a distance in color of each color intensity value in said foreground subject from said average background color, and generating a second control image by dividing said first control image into a background region, a fringe region of variable width, and a foreground region, and mixing color into foreground pixels at locations corresponding to said fringe region of said second control image from nearby background pixels at locations corresponding to said background region of said second control image, wherein said second control image comprises a plurality of values corresponding to pixels at specific locations, and wherein said step of mixing color into foreground pixels at locations corresponding to said fringe region of said second control image from nearby background pixels at locations corresponding to said background region of said second control image comprises the steps of (a) identifying a pixel in said fringe region bordered by pixels from said background region, (b) changing a color of the corresponding pixel in said foreground image to reflect an average color of a plurality of background pixels in locations corresponding to said background region near said pixel, (c) associating said pixel no longer with said fringe region but instead with said background region, and (d) repeating steps (a) through (c) for a plurality of pixels in said fringe region.

2. The method of claim 1 wherein said plurality of pixels in step (d) comprises all of the pixels in the fringe region.

3. The method of claim 1 wherein said step of changing a color of the corresponding pixel in said foreground image comprises the step of calculating an average color of background pixels in a predefined square region around said pixel.

4. The method of claim 1 further comprising the step of generating a treated image by removing color pixels whose values correspond to the background coloration from said foreground subject, determining neighboring color pixel values for selected remaining portions of said foreground subject, and mixing local background coloration into said selected remaining portions on a pixel-by-pixel basis.

5. The method of claim 4 wherein said step of mixing color into foreground pixels at locations corresponding to said fringe region of said second control image from nearby background pixels at locations corresponding to said background region of said second control image comprises the step of generating an intermediate image by mixing color with selected fringe pixels from neighboring pixel locations, and wherein said step of removing color pixels whose values correspond to the background coloration from said foreground subject comprises the step of calculating a difference between fringe pixels in said intermediate image and fringe pixels in said image.

6. The method of claim 4 further comprising the step of generating a composite image by combining said treated image with a selected background image.

7. The method of claim 6 wherein said second control image comprises an alpha channel, and wherein said step of combining said treated image with a selected background image comprises the step of mixing portions of said treated image and said selected background image in a ratio determined by said alpha channel.

8. The method of claim 6 wherein said step of combining said treated image with a selected background image results in said composite image being the same as said selected background image in regions where said second control image has a minimum value, the same as said treated image in regions where said second control image has a maximum value, and a mixture of said selected background image and said treated image in regions where said second control image has a value between said minimum value and said maximum value.

9. A method for touching up a digitally composited image comprising the steps of:

selecting a region of a composited image, said composited image comprising a foreground image and a background image bordered by a fringe region of variable width, wherein said step of selecting a region comprises the step of interactively placing a brush on a screen displaying said composited image, in a portion of said selected region corresponding to said fringe region and immediately bordered at least in part by said foreground region, replacing some of the color pixel values in said portion with color pixel values that are closer in proximity, within a color space, to said foreground region, and mixing a remaining color in said portion with a color of said foreground region.

10. The method of claim 9 wherein said step of placing a brush is carried out with a stylus, pen or mouse.

11. A method for processing a digitized subject image, said method comprising the steps of:

acquiring an image of a subject in front of a background, said image comprising a plurality of color values at each of a plurality of pixel locations, measuring the color of said background by obtaining a plurality of color values at each of a plurality of pixel locations in said background, generating a plurality of histograms, one for each color of a select group of colors, from said color values of said background, calculating an average background color from said plurality of histograms, generating a first control image by comparing said average background color and said color values of said image, dividing said first control image into a plurality of regions so as to generate a second control image, said second control image defining a background region, a fringe region, and a foreground region, and modifying color values in a portion of said image corresponding to said fringe region, wherein each of said histograms comprises a plurality of average color values, said step of generating a plurality of histograms comprising the step of deriving each of said average color values by averaging the color values at a particular pixel location with the color values of a predefined group of surrounding pixels.

12. A method for processing a digitized subject image, said method comprising the steps of:

acquiring an image of a subject in front of a background, said image comprising a plurality of color values at each of a plurality of pixel locations, measuring the color of said background by obtaining a plurality of color values at each of a plurality of pixel locations in said background, generating a plurality of histograms, one for each color of a select group of colors, from said color values of said background, calculating an average background color from said plurality of histograms, generating a first control image by comparing said average background color and said color values of said image, dividing said first control image into a plurality of regions so as to generate a second control image, said second control image defining a background region, a fringe region, and a foreground region, modifying color values in a portion of said image corresponding to said fringe region, and adjusting a location of a first frontier between said background region and said fringe region, and a location of a second frontier between said fringe region and said foreground region.

13. A method for processing a digitized subject image, said method comprising the steps of:

acquiring an image of a subject in front of a background, said image comprising a plurality of color values at each of a plurality of pixel locations, measuring the color of said background by obtaining a plurality of color values at each of a plurality of pixel locations in said background, generating a plurality of histograms, one for each color of a select group of colors, from said color values of said background, calculating an average background color from said plurality of histograms, generating a first control image by comparing said average background color and said color values of said image, dividing said first control image into a plurality of regions so as to generate a second control image, said second control image defining a background region, a fringe region, and a foreground region, and modifying color values in a portion of said image corresponding to said fringe region, said step of modifying a portion of said image comprising the step of generating an intermediate image by adding color from said background region to said fringe region, wherein said step of generating said intermediate image comprises the steps of (a) identifying a pixel in said fringe region bordered by at least one pixel in said background region, (b) changing a color of said fringe pixel to reflect an average color of a plurality of pixels in said background region, (c) associated said fringe pixel no longer with said fringe region but instead with said background region, and (d) repeating steps (a) through (c) for a plurality of pixels in said fringe region.

14. The method of claim 13 wherein said plurality of pixels in step (d) comprises all of the pixels in said fringe region.

15. The method of claim 13 wherein the step of changing a color of said fringe pixel comprises the step of calculating an average color of background pixels in a predefined square region around said fringe pixel.

16. A method for processing a digitized subject image, said method comprising the steps of:

acquiring an image of a subject in front of a background, said image comprising a plurality of color values at each of a plurality of pixel locations, measuring the color of said background by obtaining a plurality of color values at each of a plurality of pixel locations in said background, generating a plurality of histograms, one for each color of a select group of colors, from said color values of said background, calculating an average background color from said plurality of histograms, generating a first control image by comparing said average background color and said color values of said image, dividing said first control image into a plurality of regions so as to generate a second control image, said second control image defining a background region, a fringe region, and a foreground region, modifying color values in a portion of said image corresponding to said fringe region, said step of modifying a portion of said image comprising the step of generating an intermediate image by adding color from said background region to said fringe region, and generating a treated image by removing at least a portion of said background color from said image, determining neighboring color pixel values in the remaining portions of said image, and leaking a local background color from adjacent background pixels into boundary pixels of each of said remaining portions.

17. The method of claim 16 wherein said step of removing at least a portion of the background color comprises the step of calculating a difference between values of said intermediate image and values of said image.

18. The method of claim 16 further comprising the step of generating a composite image by combining said treated image with a selected background image.

19. The method of claim 18 wherein said second control image comprises an alpha channel, and wherein said step of combining said treated image with a selected background image comprises the step of mixing portions of said treated image and said selected background image in a ratio determined by said alpha channel.

20. The method of claim 18 wherein said step of combining said treated image with a selected background image results in said composite image being the same as said selected background image in regions where said second control image has a minimum value, the same as said treated image in regions where said second control image has a maximum value, and a mixture of said selected background image and said treated image in regions where said second control image has value between said minimum value and said maximum value.

21. The method of claim 18 further comprising the step of touching up said composite image.

* * * * *